Patented June 14, 1932

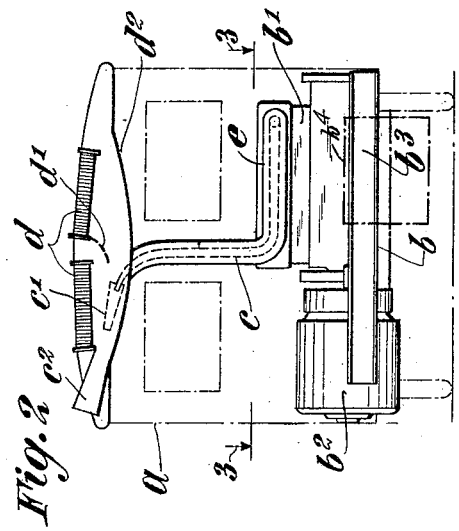
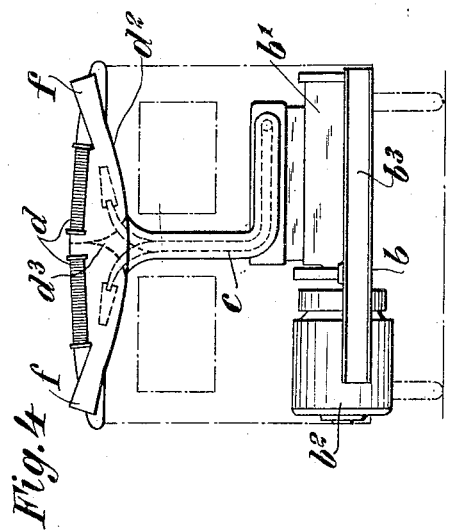
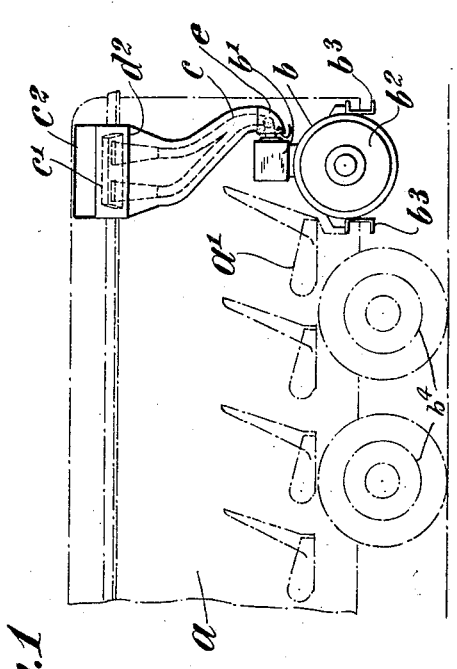
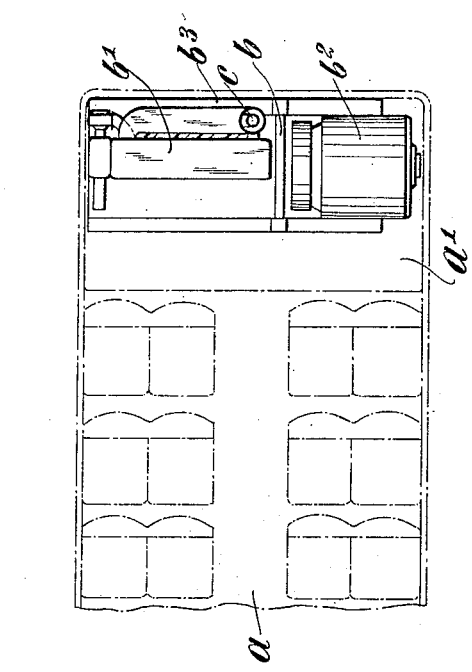

1,862,675

UNITED STATES PATENT OFFICE

CHARLES FROESCH, OF TEANECK, NEW JERSEY, AND WILLIAM B. JUPP, OF NEW YORK, N. Y., ASSIGNORS TO INTERNATIONAL MOTOR COMPANY, OF NEW YORK, N. Y., A CORPORATION OF DELAWARE

INTERNAL COMBUSTION ENGINE COOLING SYSTEM

Application filed September 27, 1927. Serial No. 222,276.

The present invention relates to an improved form of vehicle construction wherein the power unit is carried upon the frame in a manner to conserve space as well as to distribute the weight uniformly over the frame. A further factor considered in the present design is that of accessibility of the power unit and it is proposed to provide a construction wherein the unit may be removed readily, and at the same time be carried upon a mounting of great strength.

An object of the invention is to provide a vehicle construction of the above character wherein the power unit is mounted in a manner to balance the total weight on the vehicle frame which includes the constantly changing "pay" load. In some previous forms of design, no consideration has been given to the relation of weights carried upon the frame and the weight of the power unit has been added to that of the concentrated average "pay" load to unbalance the frame and cause poor riding of the vehicle with a corresponding deleterious effect upon the chassis.

A further object of the invention is to mount the power unit so that its weight may add to the traction.

A further object of the invention is to provide a new form of exhaust in connection with the body design of the rear of the vehicle, whereby the engine may be cooled and ventilated without the use of a fan and the radiators may be mounted in the roof of the vehicle, thus conserving the room available for passenger space.

Other objects of the invention will appear as the description proceeds and reference will now be had, for a more detailed description of the invention, to the accompanying drawing, wherein:

Figure 1 is a view in elevation showing a schematic layout of a vehicle constructed in accordance with the proposed invention.

Figure 2 is a rear elevational view of the manner of mounting the power unit and the cooling mechanism therefor according to one form of the invention.

Figure 3 is a view taken on line 3—3 of Figure 2 and looking in the direction of the arrows.

Figure 4 is a modified construction showing the exhaust pipe of Figure 2 as formed on either side of the figure.

Referring particularly to Figures 1, 2 and 3, $a$ designates the body of a vehicle of any desired form provided at its rear with a transversely disposed power unit $b$. This unit may be composed of an internal combustion engine $b'$ and an electric generator $b^2$, the latter generating power to drive the vehicle through suitable driving motors $b^4$ which may be carried upon the axles, or in any other suitable positions. Channels $b^3$ mount the engine and generator as a unit and enable the complete device to be carried at the rear, and transversely of the vehicle.

The exhaust line $c$ of the internal combustion engine is carried upwardly at the rear of the vehicle and discharges the exhaust gases through a Venturi throat $c'$, which in turn discharges the gases through the exhaust pipe $c^2$. Radiators $d$ are mounted in the roof of the vehicle so that the contour thereof is not disturbed and the suction created by the flow of the exhaust gases through the Venturi elements causes air to be drawn down through the radiators and carried out through the exhaust pipe $c^2$. In order that the flow of air may be controlled properly, a deflector $d'$ and housing $d^2$ are provided.

A shroud $e$ open at its lower end is carried over the exhaust line $c$ and serves to conduct air, sucked upwardly by the flow of gases through the venturi, from the exhaust manifold of the engine to the housing $d^2$ and thence out through the pipe $c^2$. In this manner, the unit is ventilated and objectionable heating of the rear of the vehicle is avoided.

In Figure 4, a modified form is shown wherein the divided exhaust line $c$ in Figures 1, 2 and 3 is constructed to conduct the gases to exhaust pipes $f$ at either side of the vehicle. In this construction, the housing $d^2$ is formed with a partition $d^3$ in order that each radiator will have its own exhaust pipe.

It will be seen that the height of the vehicle is not increased by constructing the exhaust pipes in the manner shown and placing the radiators within the roof conserves considerable space which would otherwise be taken from the room available for passengers. The seating capacity is increased, since the rear seat $a'$ extends all the way across the rear of the vehicle.

The "pay" load carried by the vehicle is always concentrated as near the front thereof as possible and the above construction provides more room at the front for ingress and egress and, additionally, removes the weight of the power units, which has been carried by the front wheels heretofore, to the rear of the vehicle to distribute the weight as uniformly as possible over the vehicle frame.

The specific arrangement of the radiators, exhaust pipes, and power units may be varied to suit different conditions and the invention is not to be limited save as defined in the appended claim.

We claim as our invention:

In a vehicle having an engine, a housing substantially above the engine, the upper wall of the housing forming a portion of the roof of the vehicle, a radiator for cooling the engine mounted in the upper wall of the housing and communicating with the atmosphere through the upper wall thereof, a pipe leading from inside said housing to the outside, and means to discharge the exhaust from the engine into said pipe, whereby air is drawn through said radiators.

This specification signed this 14th day of September, A. D. 1927.

CHARLES FROESCH.
WILLIAM B. JUPP.